(12) United States Patent
Rodgers et al.

(10) Patent No.: US 9,686,278 B1
(45) Date of Patent: Jun. 20, 2017

(54) METHOD AND SYSTEM FOR CONFIGURING COMPUTING DEVICES

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

( * ) Notice: Subject to any disclaimer, the term of this patent is extended or adjusted under 35 U.S.C. 154(b) by 176 days.

(21) Appl. No.: 14/705,589

(22) Filed: May 6, 2015

Related U.S. Application Data

(60) Provisional application No. 61/989,957, filed on May 7, 2014.

(51) Int. Cl.
*H04L 9/00* (2006.01)
*H04L 29/06* (2006.01)
(Continued)

(52) U.S. Cl.
CPC ...... *H04L 63/0876* (2013.01); *G06F 12/0811* (2013.01); *G06F 12/0824* (2013.01); *H04L 63/0457* (2013.01); *G06F 2212/283* (2013.01)

(58) Field of Classification Search
CPC ...... G06F 21/6218; G06F 21/86; G06F 21/64; G06F 12/0811; G06F 12/0824;
(Continued)

(56) References Cited

U.S. PATENT DOCUMENTS

| 7,870,153 B2 | 1/2011 | Croft et al. |
| 7,886,023 B1 | 2/2011 | Johnson |

(Continued)

*Primary Examiner* — Hosuk Song
(74) *Attorney, Agent, or Firm* — Osha Liang LLP

(57) ABSTRACT

A method and system for configuring computing devices. The method includes receiving, by a computing device, a first cache list object from a management service. The method also includes comparing the first cache list object to a second cache list object on the computing device, and based on the comparing, identifying a first object fingerprint that is present in the first cache list object and that is not present in the second cache list object. The method further includes obtaining, from a location that is external to the computing device, a first object corresponding to the first object fingerprint; and updating a configuration of the computing device using the first object.

18 Claims, 11 Drawing Sheets

(51) Int. Cl.
*G06F 12/0811* (2016.01)
*G06F 12/0817* (2016.01)

(58) Field of Classification Search
CPC ........... G06F 2212/283; H04L 63/0861; H04L 63/0876; H04L 9/3223; H04L 9/3236; H04L 63/0457
USPC ....... 713/167, 168, 181, 194; 726/22, 26, 30
See application file for complete search history.

(56) References Cited

U.S. PATENT DOCUMENTS

| | | | |
|---|---|---|---|
| 8,010,679 B2 | 8/2011 | Low et al. | |
| 8,051,180 B2 | 11/2011 | Mazzaferri et al. | |
| 8,166,261 B1* | 4/2012 | Cremelie | G06F 17/30097 |
| | | | 707/692 |
| 8,218,828 B2* | 7/2012 | Iasso | G06K 9/00885 |
| | | | 340/5.53 |
| 8,438,654 B1 | 5/2013 | von Eicken et al. | |
| 8,572,400 B2 | 10/2013 | Lin et al. | |
| 8,607,054 B2 | 12/2013 | Ramarathinam et al. | |
| 8,661,252 B2* | 2/2014 | Chandwani | H04L 29/1232 |
| | | | 713/156 |
| 8,959,108 B2* | 2/2015 | Pereira | G06F 17/30029 |
| | | | 707/769 |
| 9,495,379 B2* | 11/2016 | Zhang | G06F 11/1453 |
| 2010/0088405 A1 | 4/2010 | Huang et al. | |
| 2011/0162042 A1 | 6/2011 | Xiao et al. | |
| 2012/0151209 A1 | 6/2012 | Visnyak et al. | |
| 2013/0185715 A1 | 7/2013 | Dunning et al. | |
| 2013/0205376 A1 | 8/2013 | Narasimha et al. | |
| 2014/0101113 A1* | 4/2014 | Zhang | G06F 11/1453 |
| | | | 707/692 |
| 2014/0281500 A1 | 9/2014 | Ignatchenko | |
| 2014/0297779 A1* | 10/2014 | Pack | H04L 67/2842 |
| | | | 709/213 |
| 2014/0344475 A1 | 11/2014 | Chen et al. | |
| 2015/0007250 A1 | 1/2015 | Dicato, Jr. et al. | |
| 2015/0215308 A1 | 7/2015 | Manolov et al. | |
| 2016/0021055 A1 | 1/2016 | Krzywonos et al. | |

* cited by examiner

METHOD AND SYSTEM FOR CONFIGURING COMPUTING DEVICES

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Computing devices may require remote configuration, including, for example, updating of parameters, and the provision of software applications to be executed by the computing devices, and credentials necessary for accessing protected resources.

SUMMARY

In general, in one aspect, the invention relates to a method for configuring computing devices. The method includes receiving, by a computing device, a first cache list object from a management service. The method also includes comparing the first cache list object to a second cache list object on the computing device, and based on the comparing, identifying a first object fingerprint that is present in the first cache list object and that is not present in the second cache list object. The method further includes obtaining, from a location that is external to the computing device, a first object corresponding to the first object fingerprint; and updating a configuration of the computing device using the first object.

In general, in one aspect, the invention relates to a non-transitory computer readable medium comprising computer readable program code, which when executed by a computer processor enables the computer processor to receive, by a computing device, a first cache list object from a management service, to compare the first cache list object to a second cache list object on the computing device, and based on the comparing, identify a first object fingerprint that is present on the first cache list object and that is not present in the second cache list object. The computer readable program code further enables the computer processor to obtain, from a location that is external to the computing device, a first object corresponding to the first object fingerprint; and update a configuration of the computing device using the first object.

In general, in one aspect, the invention relates to a computing device. The computing device includes a server including a processor and a non-transitory computer readable medium including computer readable program code. The computer readable program code, when executed by the processor enables the server to provide at least one integrity measurement for the server to a management service, receive a first cache list object from a management service, compare the first cache list object to a second cache list object on the computing device, and based on the comparing, identify a first object fingerprint that is present on the first cache list object and that is not present in the second cache list object. The computer readable program code, when executed by the processor further enables the server to obtain, from a location that is external to the computing device, a first object corresponding to the first object fingerprint and update a configuration of the computing device using the first object.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to configuring a computing device. More specifically, embodiments of the invention relate to remotely configuring a computing device that is administrated by a management service. The management service may determine the elements needed for a complete configuration of the computing device and may subsequently provide these configuration elements to the computing device.

Figure 1A:
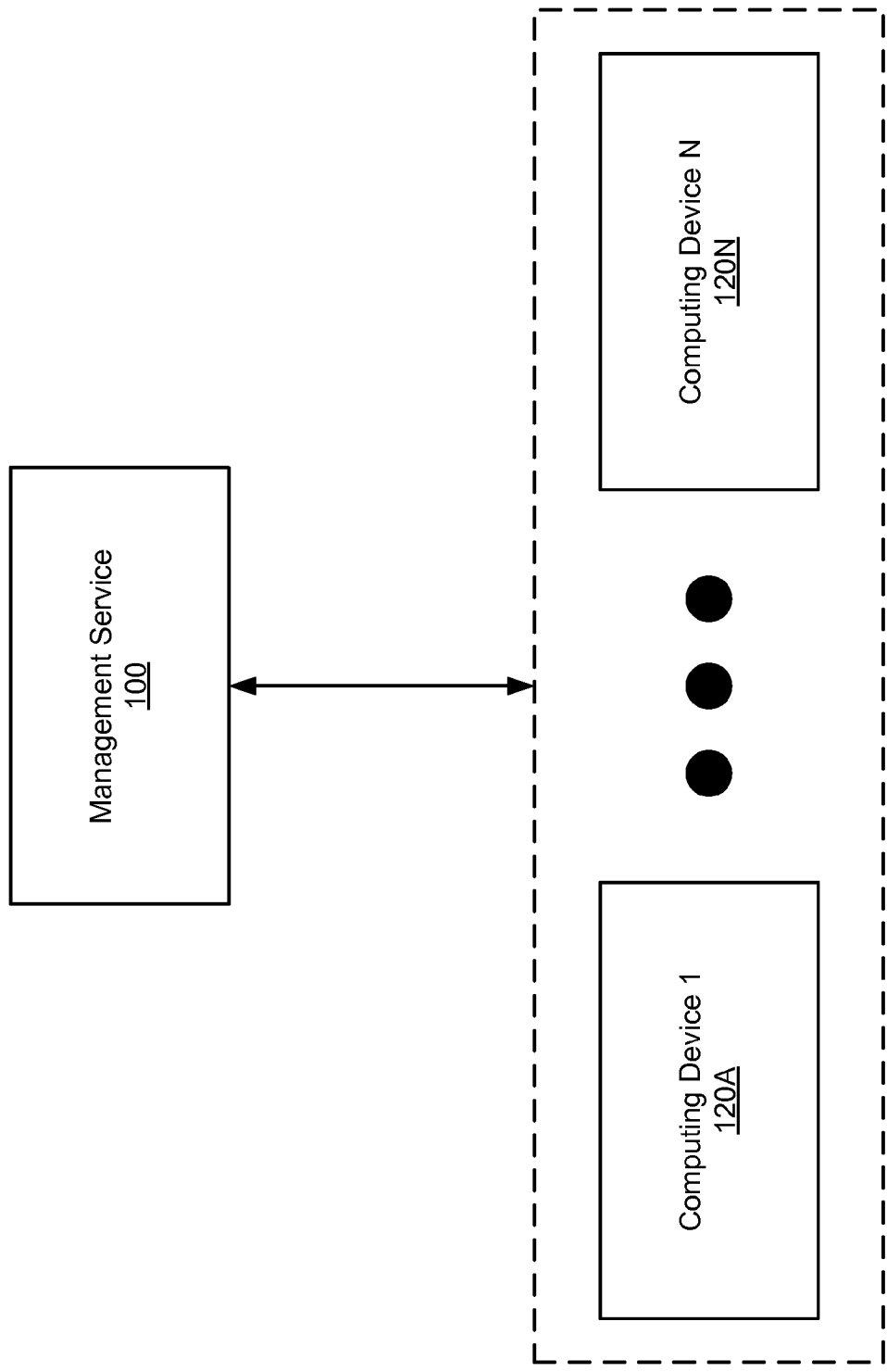
FIGS. 1A-1C show systems in accordance with one or more embodiments of the invention.

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 7-9).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

Figure 1B:
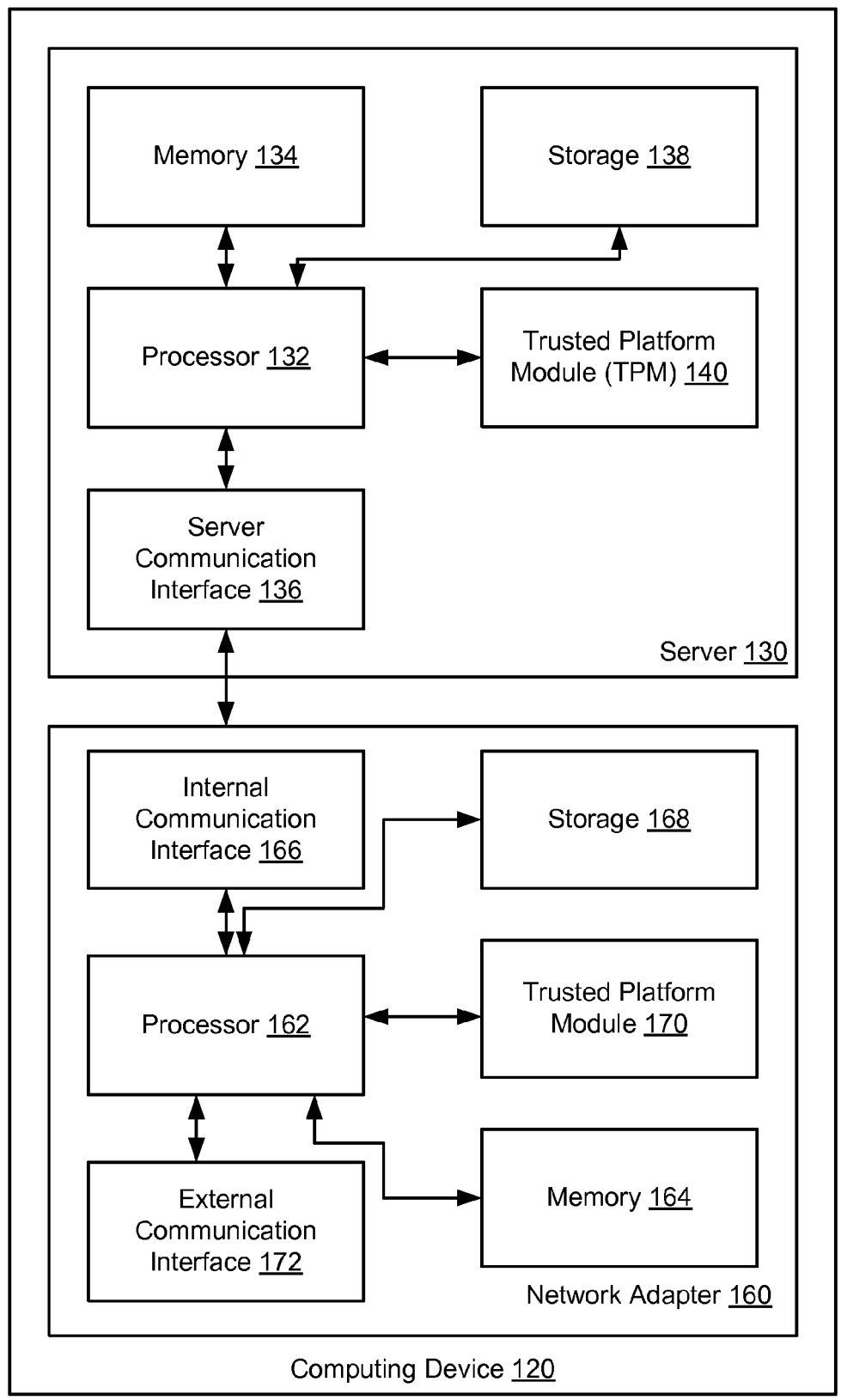

FIG. 1B shows a system in accordance with one or more embodiments of the invention. In one or more embodiments of the invention, computing device (120) includes two components: a server (130) and a network adapter (160). Each of these components is described below.

Figure 1C:
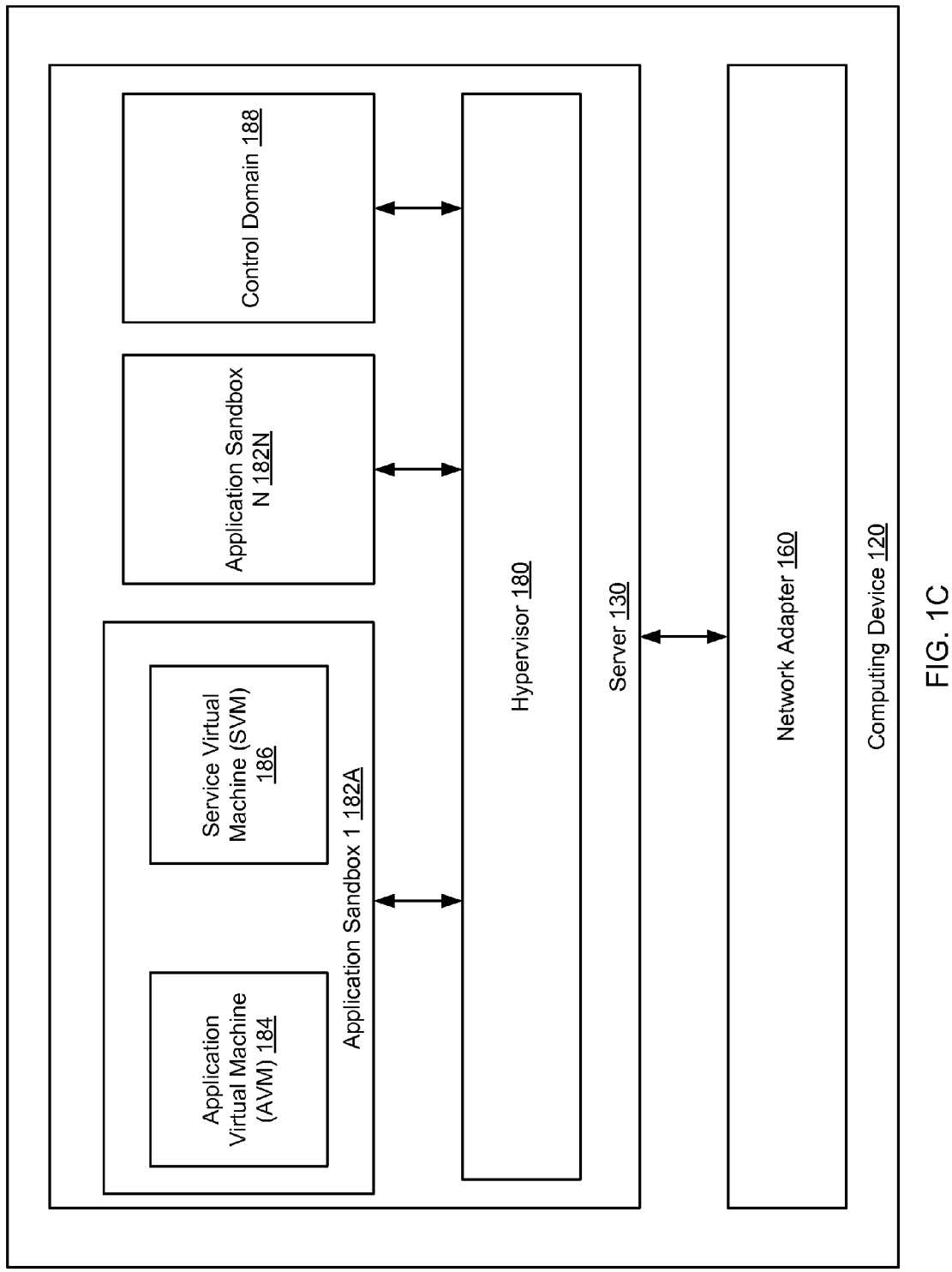

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain.

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
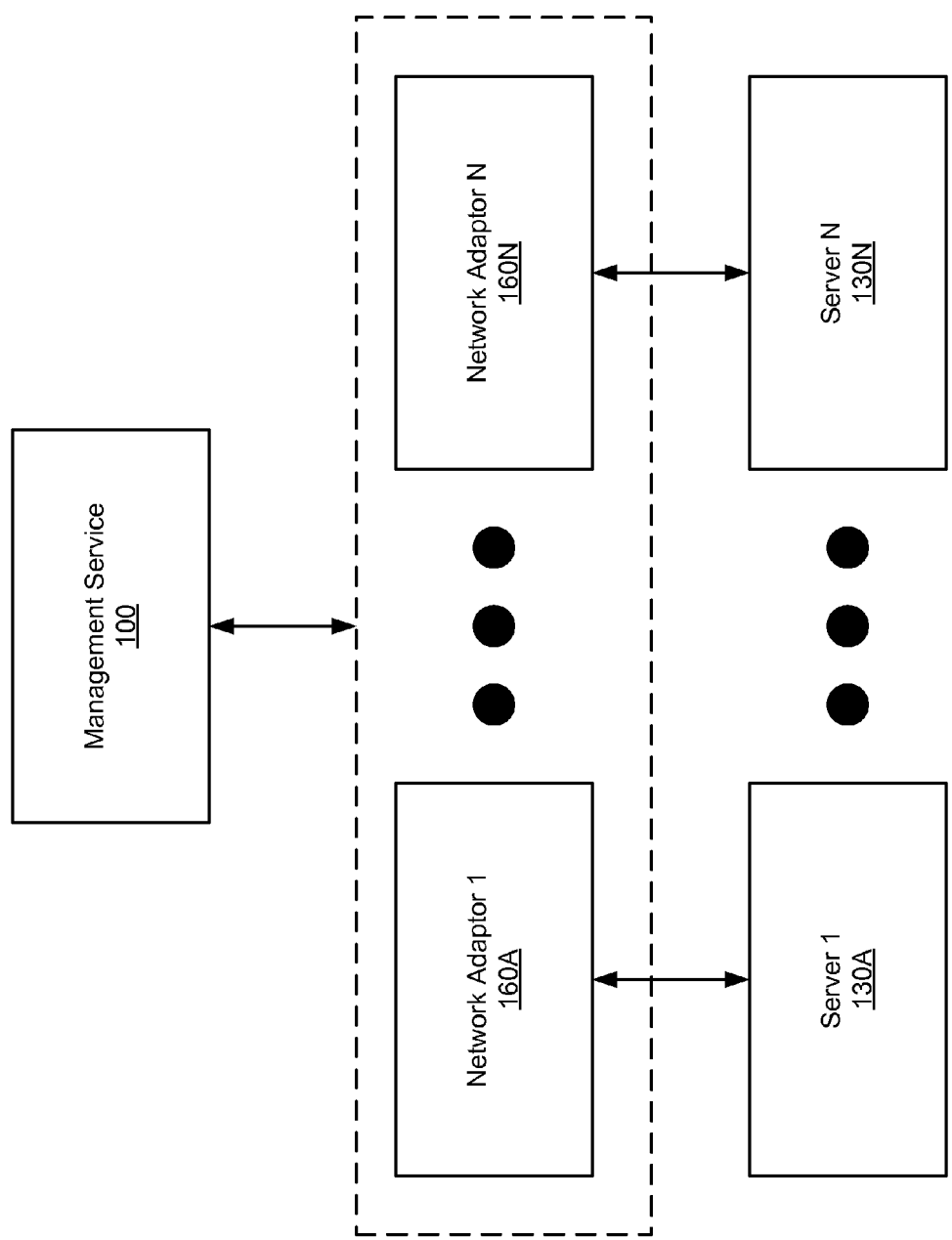
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
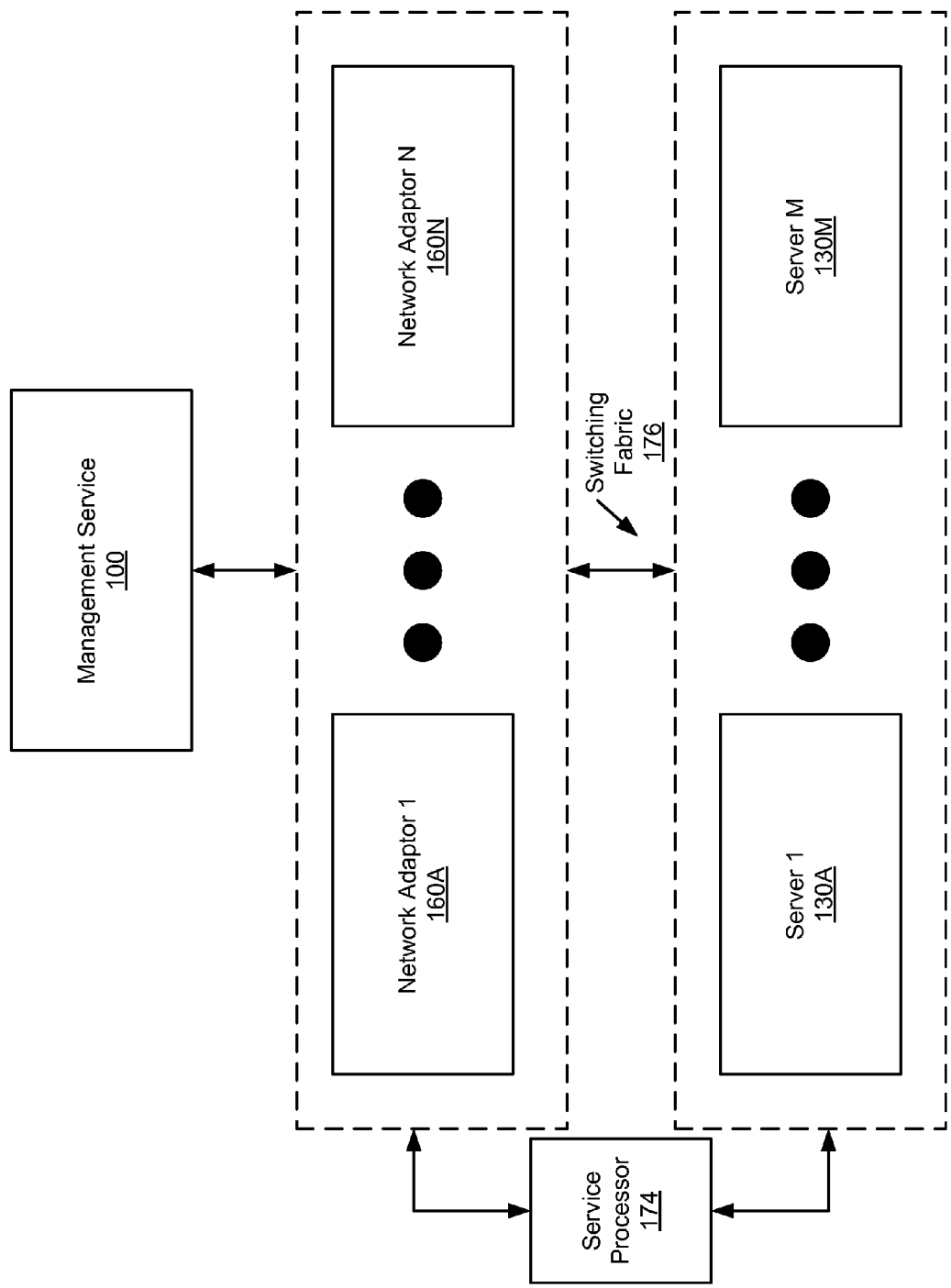
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may require configuration. More specifically, a computing device (120) may need to be configured by the management service (100). A computing device (120) may need to be configured, for example, when the computing device (120) is initially deployed, when an application is deployed on an existing computing device (120), when the computing device (120) boots or reboots, when software is updated, when user credentials are changed, or in any other situation where an element of the computing device's (120) configuration needs updating.

Figure 4:
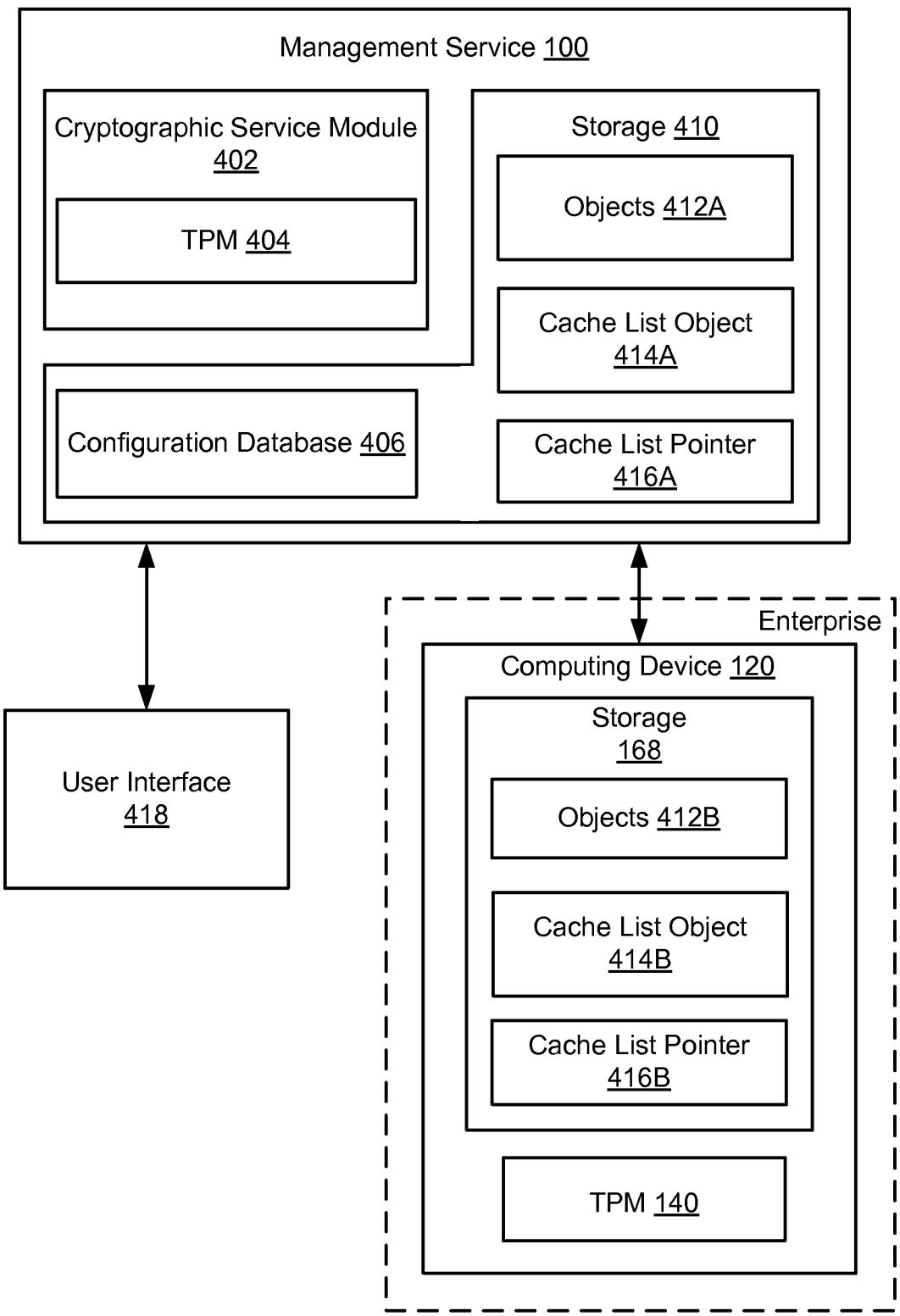
FIG. 4 shows a system in accordance with one or more embodiments of the invention.

FIG. 4 shows various components of the system previously described in FIGS. 1A-3 that may be used to configure the computing device (120) in accordance with one or more embodiments of the invention. The other components of the system (while present) are omitted from FIG. 4 for purposes of clarity.

Turning to FIG. 4, in one or more embodiments of the invention, the management service (100) (described above) includes a cryptographic service module (402) and includes and/or has access to storage (410). Each of these components is described below.

In one embodiment of the invention, the management service (100) includes a cryptographic service module (402). The cryptographic service module (402) may be a combination of hardware and software.

In one embodiment of the invention, the hardware component of the trusted cryptographic service module (402) is a trusted platform module (TPM) (404) that may be similar to the TPM (140) of the computing device (120) (described above).

In one embodiment of the invention, the software component of the cryptographic service module (402) may include any set of machine-readable instructions which, when executed performs a set of cryptographic functions (e.g., processing data sets that include cryptographically protected data), further described in detail below, with reference to FIGS. 7 and 8. In one embodiment of the invention, the software component of the cryptographic service module (402) provides an interface enabling authorized components of the management service (100) to access the TPM (404). In one embodiment of the invention, the cryptographic service module (402) is functionally isolated from other components of the management service (100) with limited input/output interfaces for the exchange of data between the cryptographic service module (402) and the components of the management service (100) that are authorized to interact with the cryptographic service module. For example, the exchange of data from and to the cryptographic service module (402) may only be performed via a shared directory (not shown) located in storage (410) (described below) that the cryptographic service module may access using the Secure File Transfer Protocol (SFTP). Further, the cryptographic service module (402) may only receive data from a component of the management service (100) if the cryptographic service module (402) has initiated the transfer of data (for example, by initiating connectivity with the component in order to request the data). Data that has not been requested by the cryptographic service module (402) may therefore be rejected. In addition, in order to further isolate the cryptographic service module from any other components of the management service (100), the cryptographic service module may only operate using volatile memory reserved for the cryptographic service module (402) and that is not accessible by any other component of the management service (100).

In one or more embodiments of the invention, the management service (100) includes and/or has access to storage (410). The storage (410) corresponds to any persistent (non-volatile) storage. The storage (410) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage. In one embodiment of the invention, objects (412A), a cache list object (414A), and a cache list pointer (416A) are stored in the storage (410) of the management service (100). The object (412A), the cache list object (414A), and the cache list pointer (416A) may be used by the management service (100) to convey configuration information to the computing device (120) (see also FIGS. 5 and 6). In one embodiment of the invention, the storage (410) further includes a configuration database (406) that the management service uses to store configuration data for the computing devices (120) that are managed by the management service (100). The configuration data stored in the configuration database (406) may be, for example, sets of characters and/or numbers representing configuration parameters, credentials, or any other type of instruction, including software images and references to external objects such as software images, network-reachable data and services, etc., used to configure the computing device (120). The configuration data stored in the configuration database (406) may be encrypted, or it may not be encrypted. Configuration data may further include software images of applications to be deployed on the computing device (120). If the management service (100) manages multiple computing devices (120), all configuration data for all computing devices (120) managed by the management service may be stored in the configuration database. The configuration database may be a SQL database or any other type of database suitable for storing configuration data. In one embodiment of the invention, the objects (412A), the cache list object (414A), and the cache list pointer (416A) are derived from the configuration data stored in the configuration database (406), as further described below with reference to FIG. 7.

In one embodiment of the invention, the system includes a user interface (418) that interfaces with the management service (100). The user interface (418) may be any set of machine-readable instructions running on any type of computing device (e.g. a desktop PC, a laptop PC, a tablet, a smart phone, etc.), that enable an administrator to provide commands to the management service (100) and to receive information from the management service (100). In one embodiment of the invention, the user interface (418) is an administrative portal that enables an administrator to configure and monitor the computing devices (120) that are under the control of the management service (100). In one embodiment of the invention, the user interface (418) is executing on a computing device separate from the computing device that hosts the management service (100). The user interface (418) may communicate with the computing device(s) using any combination of wired and/or wireless communication protocols. Further, the user interface (418) may communicate with the management service via a local area network (e.g., an enterprise network, and/or wide area network (e.g., over the Internet)). The communication between the user interface (418) and the management service (100) may include any combination of secured (e.g., encrypted) and non-secure (e.g., un-encrypted) communication channels. In one embodiment of the invention, secure communication is provided if necessary, even in case of a non-secure underlying communications channel. The secure communication may be replay resistant, delete-resistant, injection-resistant, and tamper-resistant in both directions, regardless of whether the transmitted content is encrypted or not. The manner in which the management service and the user interface communicate may vary based on the implementation of the invention, e.g., the communication may be performed via a machine-machine API interface. Encryption may be performed, for example, using public-private pairs of cryptographic keys, symmetric cryptographic keys, or any other encryption method.

In one embodiment of the invention, the user interface includes a graphical user interface (GUI) and/or a command line interface. The GUI may be configured to display information provided by the management service (100) and/or provided by the computing device(s) (120) via the management service (100). Further, the GUI may be configured to accept input from an administrator using one or more GUI widgets (e.g., radio buttons, drop-down lists, textboxes, etc.), thus enabling the administrator to interact with the displayed content and to control the management service (100) and/or the computing device(s) (120). In one embodiment of the invention, the user interface (418) may be a web-browser-based application. Alternatively, the user interface (418) may be a standalone application. The details of the interaction between user interface (418) and management service (100) are described below, with reference to FIGS. 7 and 8.

In one or more embodiments of the invention, the computing device (120) (previously described) includes a TPM (140) and a storage (168) (both previously described). In one embodiment of the invention, objects (412B), a cache list object (414B), and a cache list pointer (416B) are stored in the storage (168) of the computing device (120). In one embodiment of the invention, the objects (412B), the cache list object (414B) and the cache list pointer (416B) are related to the objects (412A), the cache list (414A) and the cache list pointer (416A) stored in the storage (410) of the management service (100), as further described in detail below with reference to FIGS. 7-9.

Figure 5:
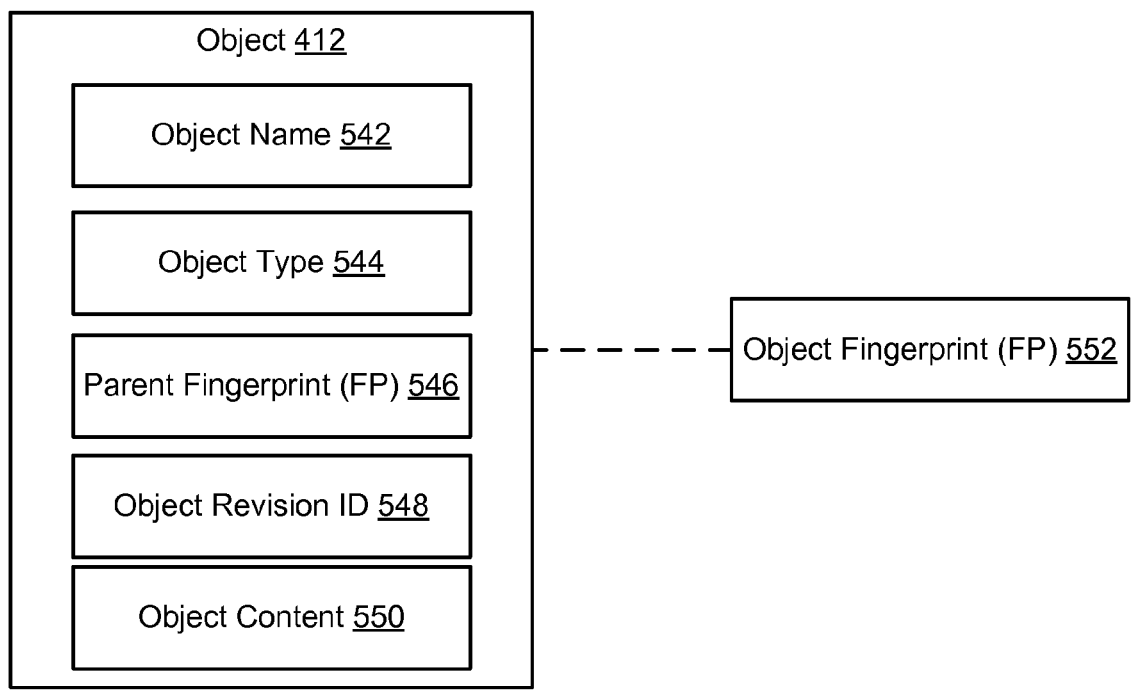
FIG. 5 shows a system in accordance with one or more embodiments of the invention.

Turning to FIG. 5, FIG. 5 shows an object (412) and a corresponding fingerprint (552) in accordance with one or more embodiments of the invention. In one embodiment of the invention, an object is a file that includes a set of machine-readable instructions used to convey configuration information, enabling, for example, the management service (100) to provide configuration instructions to the computing device (120). The use of objects for conveying configuration information is described in detail below, with reference to FIGS. 7-9. The object may be stored in a format that is human readable. In one embodiment of the invention, a markup language, for example, the Java Script Object Notation (JSON) is used to store configuration information in an object (412). In one embodiment of the invention, an object includes multiple elements, including an object name (542), an object type (544), a parent fingerprint (546), an object revision ID (548), and an object content (550). The object name (542), the object type (544), the parent fingerprint (546), the object revision ID (548) and the object content (550) may be strings of characters and/or numbers of any length and/or complexity in the file that represents the object. Each of these strings may be delimited by specific identifiers, for example, by JSON object delimiters. In one embodiment of the invention, the object name (542) is a descriptive identifier of the object. In one embodiment of the invention, the object type (544) classifies the content and/or function of the object. Classifications may include, for example, entitlements (e.g., definition of privileges), images (e.g., software packages to be deployed), etc. In one embodiment of the invention, the parent fingerprint (546) is a cryptographic identifier of a parent object. Embedding a fingerprint of a parent object in the object enables the construction of tree-like hierarchies of objects, where objects depend from parent objects, thus enabling the communication of multiple configuration parameters in a structured manner. The details of the use of fingerprints and object hierarchies for the purpose of communicating configuration parameters are described in detail below, with reference to FIG. 7-9. In one embodiment of the invention, the object revision ID (548) is an ID that is modified with each change made to the object, for example, when the parameter the object conveys is updated. In one embodiment of the invention, the object content (550) is the configuration data to be conveyed to the computing device to be configured. The object content (550) may be of any type, for example, it may be a parameter value, a credential, a software image to be deployed on a computing device, etc.

In one embodiment of the invention, a fingerprint (552) is cryptographic identifier affiliated with the object (412). A fingerprint may be any combination of characters and/or numbers that is globally unique to the object (412) with which it is affiliated and which it defines. In one embodiment of the invention, the fingerprint (552) affiliated with the object (412) is a hash (for example an SHA-1 or SHA-2 hash)) of the object (412). The fingerprint (552) may therefore need to be recomputed each time the object (412) changes. In one embodiment of the invention, a fingerprint may be used as an identifier for an object, as further described below with reference to FIGS. 7-9. In one embodiment of the invention, a fingerprint is further used for the detection of any tampering with an object transmitted over a potentially insecure communication channel, thereby guaranteeing the integrity of an object.

Figure 6:
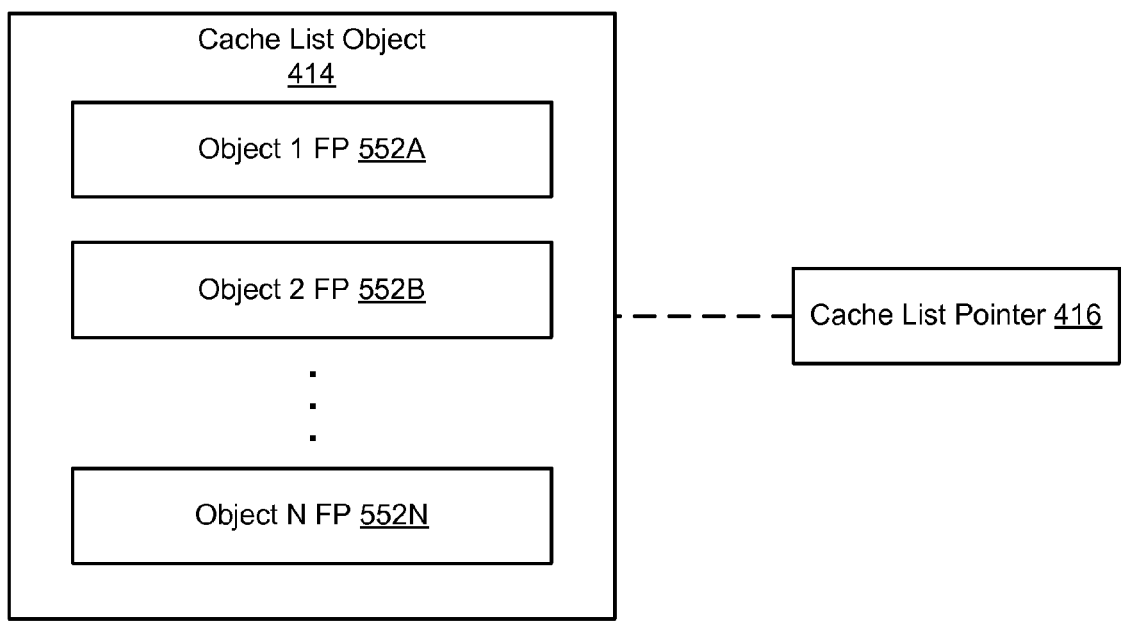
FIG. 6 shows a system in accordance with one or more embodiments of the invention.

Turning to FIG. 6, FIG. 6 shows a cache list object (414) and corresponding cache list pointer (416) in accordance with one or more embodiments of the invention. In one embodiment of the invention, a cache list object (414) is a collection of the fingerprints of objects that may be used to configure a computing device (120). In one embodiment of the invention, the cache list pointer (416) affiliated with the cache list object (414) is a fingerprint of the cache list object (414). In one embodiment of the invention, the cache list pointer (416) may be a hash (for example an SHA-1 or SHA-2 hash)) of the cache list object (414). In one embodiment of the invention, the cache list pointer (416) therefore is unique for the combination of all object fingerprints (552A, 552B, 552N) that are included in the cache list object (414). The cache list pointer (552) may therefore need to be recomputed each time any object (552), whose fingerprint is included in the cache list object (414), changes. The use of the cache list object (414) and the cache list pointer (416) is described in detail below, with reference to FIGS. 7-9.

One skilled in the art will recognize that the architecture of a system is not limited to the components shown in FIGS. 1A-6. For example, the system may include multiple computing devices, a computing device may include multiple application sandboxes, an application sandbox may include multiple applications. Further, many objects that may include different types of configuration information may be used to configure a computing device. In addition, each time a configuration changes, the objects, representing the aspects of the configuration information that are changing, may be updated. Accordingly, object fingerprints, the cache list object, and the cache list pointer may also change over time.

Figure 7:
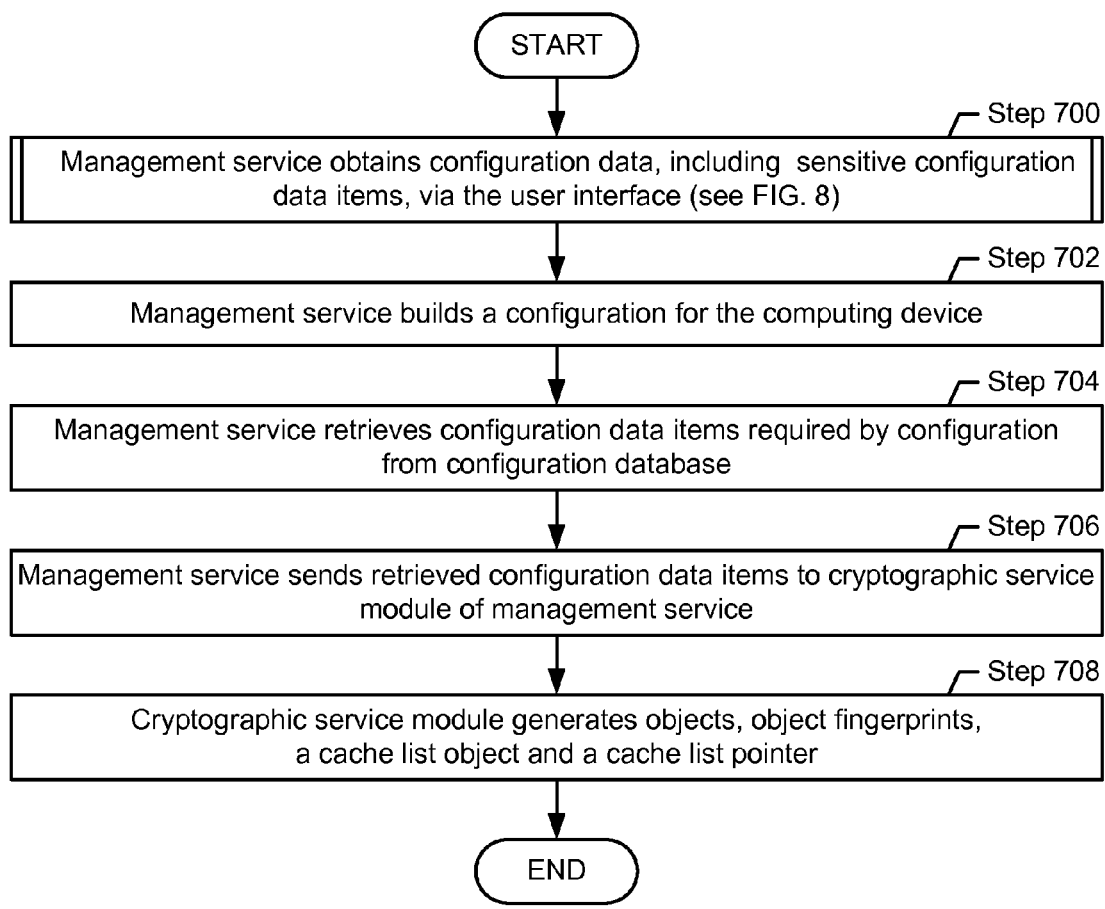
FIG. 7 shows a flowchart in accordance with one or more embodiments of the invention.
Figure 8:
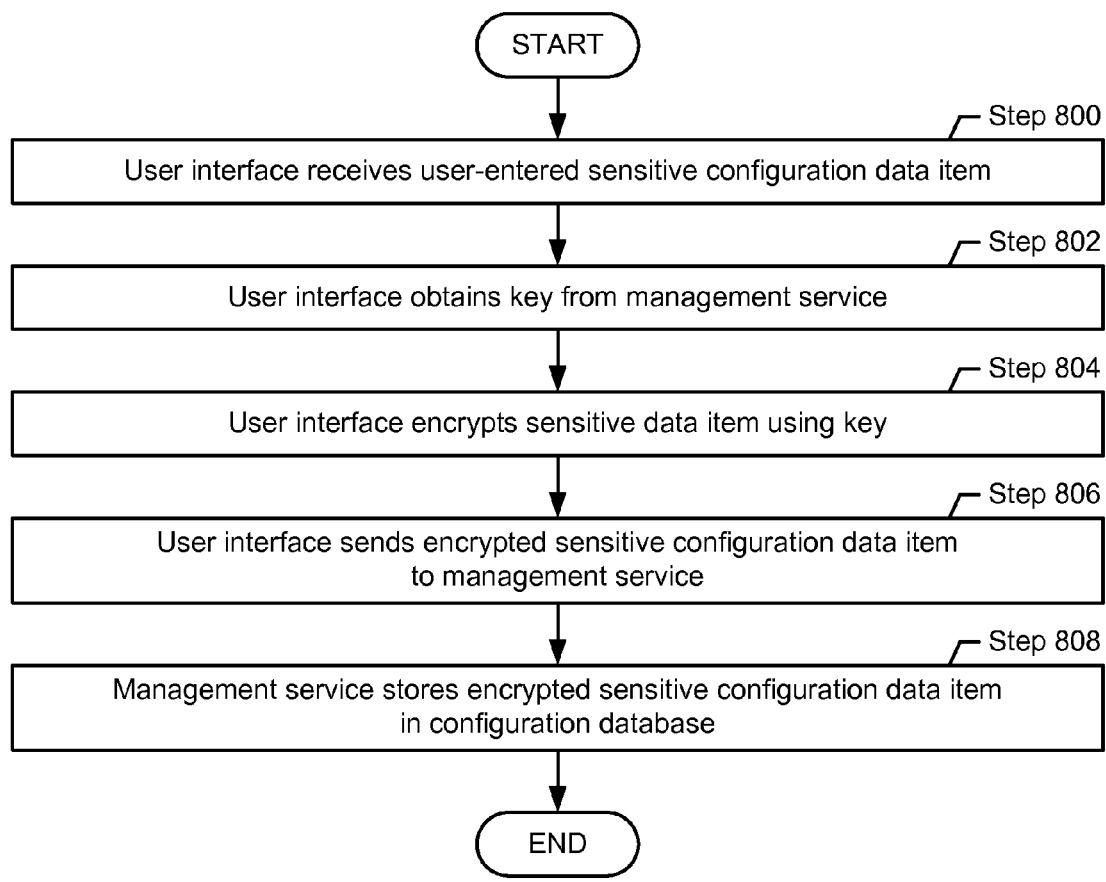
FIG. 8 shows a flowchart in accordance with one or more embodiments of the invention.
Figure 9:
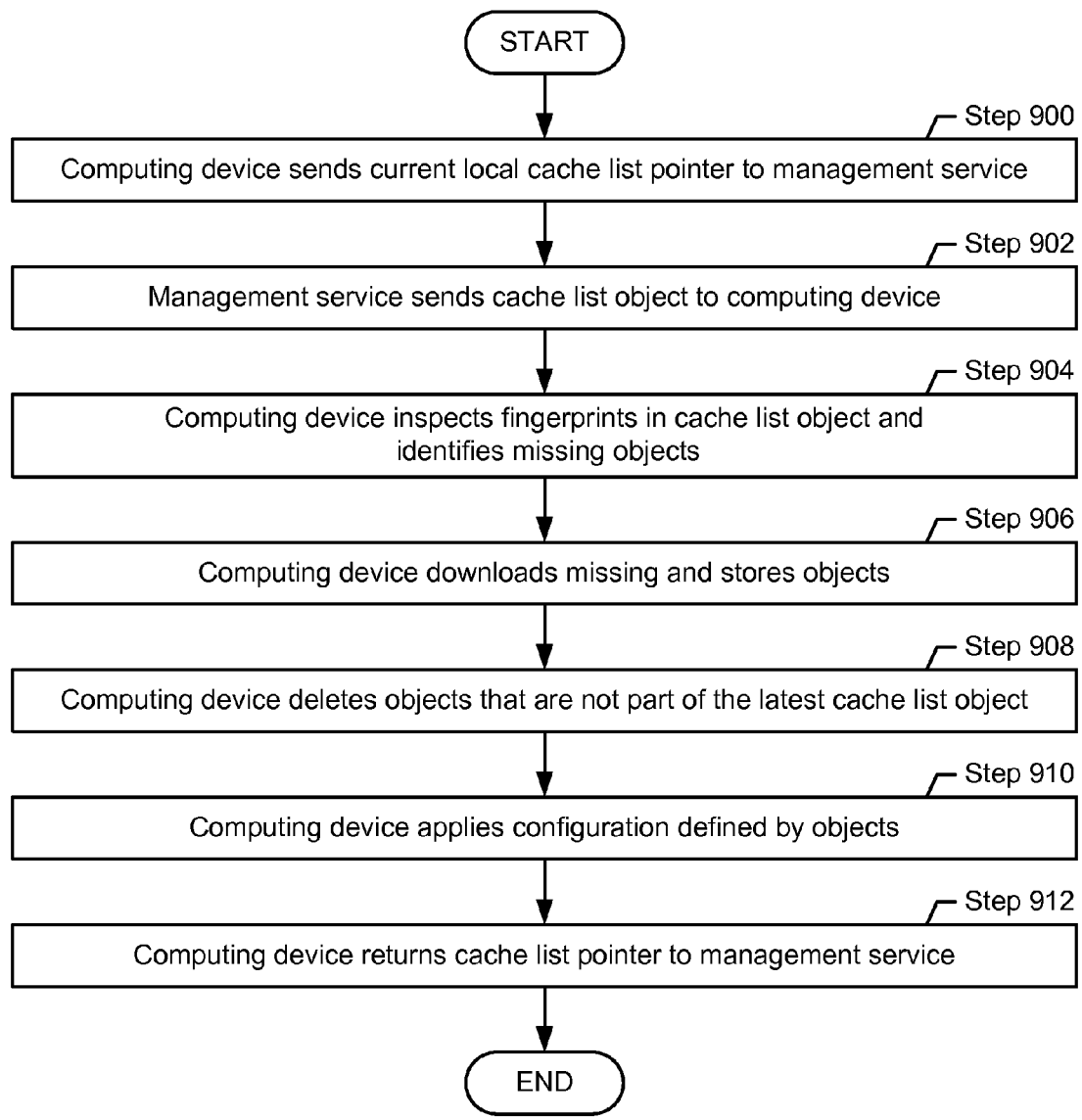
FIG. 9 shows a flowchart in accordance with one or more embodiments of the invention.

FIGS. 7-9 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 7-9 may be performed in parallel with any other steps shown in FIGS. 7-9 without departing from the invention.

FIG. 7 shows a method for generating, by the management service, a cache list that represents a configuration for a computing device, in accordance with one or more embodiments of the invention. In one embodiment of the invention, a configuration for a computing device may be prepared in order to perform an initial configuration of the computing device and/or to replace an existing configuration of the computing device. The method described in FIG. 7 may be performed, for example, in order to deploy a new application, to add or remove users, to update entitlements, to change/add/remove any other kind of parameter of the computing device, etc.

In one or more embodiments of the invention, a prerequisite for executing the method described in FIG. 7 is that the management service has verified the integrity of the computing device (discussed above).

Turning to FIG. 7, in Step 700, the management service obtains configuration data, that may include sensitive configuration data (i.e., data to be protected from unauthorized access), from a user, via the user interface (see FIG. 4, 418). The configuration data received by the management service from the user interface may be stored in the configuration database. In one embodiment of the invention, the execution of Step 700 is optional, and may not be performed if the management service already has access to the configuration data required to build the configuration for the computing device to be configured. The details of Step 700 are described in FIG. 8.

In Step 702, the management service builds the configuration for the computing device to be configured. Building the configuration includes identifying all configuration data items permitted to be applied to the configuration of the computing device. Depending on the intended configuration of the computing device, different configuration data items may be included in the configuration being built. For example, a configuration intended to configure the computing device for running software application A may require the configuration to include an image of software application A and parameters for configuring software application A, whereas a configuration intended to configure the computing device for running software application B may require the configuration to include an image of software application B and parameters for configuring software application B.

In Step 704, the management service retrieves the configuration data items required for the configuration of the computing device (i.e., the configuration data items identified in Step 702) from the configuration database of the management service. In one embodiment of the invention, the set of configuration data items retrieved from the configuration database are specific to the computing device to be configured.

In Step 706, the management service sends the set of configuration data items, retrieved from the configuration database, to the cryptographic service module of the management service. The configuration data items may be indirectly provided to the cryptographic service via a shared directory that is accessible only via the Secure File Transfer Protocol (SFTP) by components of the management service that are authorized to access the shared directory. The cryptographic service module may subsequently retrieve the configuration data items from the shared directory using SFTP.

In Step 708, the cryptographic service module generates objects, object fingerprints, a cache list object, and a cache list pointer from the configuration data items retrieved from the shared directory. In one embodiment of the invention, the cryptographic service module first inspects the received configuration data items. The inspection may include, for example, parsing metadata and tags in order to identify faulty configuration data items. In one embodiment of the invention, the cryptographic service module may validate externally determined and locally originating configuration data items, including, for example, appliance serial numbers, image fingerprints, appliance TPM-specific key fingerprints, other key fingerprints (including those that may be used for at-rest encryption of the configuration), etc. If the configuration data items include images of an application software to be sent to the computing device, the inspection may include a verification of the fingerprints accompanying the images. Using the fingerprint verification, attempts, by a $3^{rd}$ party with malicious intent, to alter the images and/or to inject malicious code, may be detected, thereby ensuring the integrity of the image.

Subsequently, the cryptographic service module may generate objects and the affiliated object fingerprints from the configuration data items. One object may be generated for each configuration data item (e.g., a parameter, a credential, an image of an application, etc.). An object may be generated by encapsulating the configuration data item with the JSON framework used to define objects, as previously described with reference to FIG. 5. For example, the configuration data item to be converted into an object may become the object content, delimited by the appropriate JSON identifiers. Further, an object name, an object type, a parent fingerprint, and an object revision ID may be added, each delimited by the appropriate JSON identifiers, thus generating a complete object. Once the object is generated, the cryptographic service module may compute the fingerprint affiliated with the object. The fingerprint may be an SHA-1 or SHA-2 hash of the object. In one embodiment of the invention, the objects to be used for configuring the computing device may be generated in a particular order. Because an object includes the fingerprint of the parent object, parent objects may need to be generated before children, grandchildren, etc., may be generated.

In one embodiment of the invention, the integration of the parent fingerprint in an object hierarchically structures the objects in a tree-like structure (parent-pointer tree) where parent objects may have child objects, etc. For example, in a configuration used to deploy a software image on a computing device, the application instance intended to be executed on the computing device may be the parent of an image object, permissions, entitlements, etc. Depth and complexity (including the number of objects) of the hierarchical structure may vary depending on the configuration that is being prepared for a computing device. In one embodiment of the invention, the parent fingerprints included in the objects, in combination with the cache list pointer, further described below, restrict the objects that may be included in the parent-pointer tree. In one embodiment of the invention, only objects represented in the cache list by their corresponding fingerprints may name other objects to be included in a configuration. An object may name another object using the other object's fingerprint. Further, named objects that may be considered starting objects to attach to the parent-pointer-tree may need to be named in a manifest that the root of the parent-pointer tree points to. Objects that are not included in the manifest may therefore not be starting objects attaching to the parent-pointer tree.

The parent-pointer tree enables, for example, updating specific parts of a configuration without affecting the global tree, thereby avoiding having to re-fetch and re-process other aspects of the configuration. In one embodiment of the invention, a configuration data item may include sensitive data, e.g., access credentials, keys, etc. The sensitive configuration data item may initially be provided by a user entering the sensitive configuration data item into the user interface. The user interface encrypts the sensitive configuration data item and sends the sensitive configuration data item to the management service, where the encrypted sensitive configuration data item is added to the configuration database. A detailed description of the steps performed for obtaining the sensitive configuration data item, for encrypting the sensitive configuration data item, and for sending the encrypted sensitive configuration data item to the management service is provided below, with reference to FIG. 8. In one embodiment of the invention, when the cryptographic service module encounters an encrypted sensitive configuration data item when generating the objects from the configuration data items, it performs all the steps for generating objects, as described above, but in addition re-encrypts the sensitive configuration data item. In one embodiment of the invention, the cryptographic service module first decrypts the encrypted sensitive configuration data item. The user interface may have encrypted the sensitive configuration data item using a key provided by the cryptographic service module of the management service.

More specifically, the trusted platform module (TPM) may have provided the public key of a public-private key pair to the user interface. The user interface may use the public key to encrypt the sensitive configuration data item, before sending the sensitive configuration data item to the management service. Accordingly, the TPM decrypts the sensitive configuration data item using the corresponding private key. In one embodiment of the invention, the private key may never leave the TPM and, accordingly, the decryption of the encrypted sensitive configuration data item may only be performed inside the TPM.

Subsequently, the decrypted sensitive configuration data item may be re-encrypted. In one embodiment of the invention, the sensitive configuration data item is re-encrypted using a key provided by the computing device. The re-encryption may be performed, for example, using another public key of a public-private key pair provided by the TPM of the computing device. Accordingly, the re-encrypted sensitive configuration data item may only be decrypted by the TPM of the computing device that is the destination of the sensitive configuration data, but not by any other TPM of any other computing device. In one embodiment of the invention, the re-encryption may be performed within the TPM of the management service. In this case, the public key generated by the TPM of the computing device may have been provided to the TPM of the management service before the re-encryption. Alternatively, the re-encryption may be performed by the cryptographic service module. Once the re-encryption is completed, an object may be generated from the re-encrypted sensitive configuration data item, as previously described.

In one embodiment of the invention, only the sensitive configuration data item may be encrypted (i.e., only the object content (see FIG. 5, 550)) with the remaining portions of the object remaining unencrypted. By only encrypting the sensitive configuration data item, but not the entire object, may enable a firewall to inspect the object, while the sensitive configuration data remains protected. Even though objects may not be encrypted, the object and entire trees of objects may remain protected against tampering (including, for example, injection, altering, replay, deletion, etc.). In addition, not encrypting the entire object may facilitate maintaining logs of objects in clear text that may be used to monitor configuration changes made to the computing device and that may further be used for debugging.

In the embodiments described above, public-private key pairs are used to protect the transmission of the sensitive configuration data item from the user interface to the management service, and from the management service to the computing device. In other embodiments, symmetric keys, or any other cryptographic method suitable for protecting the sensitive configuration data item from unauthorized access, may be used.

In one embodiment of the invention, a configuration data item may include a software image, for example, an application image to be deployed, a system software component to be installed, etc. Software images may be large (up to, for example, hundreds of gigabytes), and it may therefore be impractical to include the software image as object content in an object. Furthermore, the same software image (e.g., an operating system update) may be required by multiple computing devices. In order to avoid excessive network traffic resulting from sending a complete software image to each computing device via an object, the software image may be pre-provisioned at certain locations from which the computing devices may obtain the software image. In addition, other types of objects (i.e., non-image objects) may also be pre-provisioned at certain location. Accordingly, in one embodiment of the invention, instead of including object content (i.e., FIG. 5, 550), the object may include information to obtain the object content (also referred to as "reference information"). The reference information may include the name of the object content, the location from where the object content may be obtained, an authentication code necessary to access the object content, and a fingerprint of the object content to be retrieved that may enable the computing device retrieving the object content to verify the authenticity of the object content. Accordingly, the computing device receiving the object may use the reference information provided within the object to obtain the object content. In one embodiment of the invention, the object content may be located on the management service, for example, in the storage of the management service. In other embodiments, the object content may be located on a file server that may be near the computing device, and/or on a peer computing device (i.e., another computing device managed by the management service) that is operatively connected to the computing device that requires the object content. Accordingly, the location information in the object may point to the management service, a file server, and/or a peer computing device from which the computing device may be authorized to retrieve the object content. In one embodiment of the invention, the location information in the object may include a list of entries for the location of the object content to be retrieved, i.e., multiple sources, from where the object content may be retrieved, may be available. The list may be ordered based on the accessibility of the sources. For example, a local computing device having the object content may be ranked higher than a remote computing device having the object content because the object content may be downloaded from the local computing device more quickly than from the remote computing device. In this example, the local computing device may be in the same physical location as the computing device while the remote computing device may be located in a different physical location than the computing device.

In one embodiment of the invention, the reference information may also include an authorization code that the computing device may present to the source in order to prove that the computing device is authorized to retrieve the object content. The authorization code may be, for example, a one-time key, a session key, or any other means that enables the computing device to prove that the computing device is authorized to retrieve the object content. The reference information may also include a fingerprint of the object content (e.g. a SHA-1 or SHA-2 hash of the object content) that may be used by the computing device to verify the integrity of the received object content. The details of the method for requesting and receiving object content from a source having the object content is described in detail below with reference to FIG. 9.

In one embodiment of the invention, whenever an object changes, the object fingerprint needs to be recomputed. Due to the hierarchical object dependencies (as previously described, an object may include the fingerprint of the parent object), child objects (and their fingerprints), grandchild-objects (and their fingerprints), etc. change whenever a parent object (and the parent object's fingerprint) changes.

In one embodiment of the invention, once all objects that are part of a computing device's configuration and all associated fingerprints have been generated, the cryptographic service modules may collect all fingerprints to include the fingerprints in the cache list object. Subsequently, in accordance with one embodiment of the invention, the cryptographic service module computes the cache list pointer, i.e., the fingerprint affiliated with the cache list object. The cache list pointer may be an SHA-1 or SHA-2 hash of the cache list object. Because the cache list pointer is a hash obtained from all fingerprints of all objects of the configuration, the cache list pointer is a globally unique identifier for all configuration data included in the configuration. Accordingly, any change of any configuration detail may result in a different cache list pointer, and the cache list pointer may therefore need to be re-computed each time an object is updated, added or removed.

In one embodiment of the invention, the cryptographic service module may transfer the objects, the cache list object, and the cache list pointer to the shared directory in the storage of the management service, after the objects, the cache list object, and the cache list pointer have been generated, thus enabling the management service to use the cache list, the cache list pointer, and the objects to configure the computing device, as further described below with reference to FIG. 9.

FIG. 8 shows a method for obtaining a configuration data item that is required for the configuration of a computing device, where the configuration data item is not already included in the configuration database or that requires updating in accordance with one or more embodiments of the invention. In one embodiment of the invention, the configuration data item is obtained from a user (e.g., the system administrator) via the user interface. In one embodiment of the invention, the configuration data item may be a sensitive configuration data item (e.g. a user name, password, or other types of credentials, etc.) that needs to be protected from unauthorized access. In one embodiment of the invention, the steps described in FIG. 8 may be repeated if multiple configuration data items need to be obtained from the user via the user interface.

Turning to FIG. 8, in Step 800, the user interface receives a sensitive configuration data item entered by the user. In Step 802, the user interface obtains a key to be used to protect the transmission of the sensitive configuration data item from the user interface to the management service. The user interface may, for example, request a key upon receipt of the sensitive configuration data item, or the user interface may have been pre-provisioned with a key or a set of keys. In one embodiment of the invention, the key, to be used for the encryption of the sensitive configuration data item, is a dynamically provided public half of a public-private key pair generated by the TPM of the management service. The key may be accompanied by a signature enabling the user interface to perform an authenticity verification against a corresponding fingerprint that may have been provided out-of-band by the management service to the user interface, prior to the user interface connecting to the management service. Alternatively, the key may be a symmetric key, or any other type of key suitable to protect the sensitive configuration data item for the transmission from the user interface to the management service. In one embodiment of the invention, the key may be periodically rotated, and/or it may be a one-time-use key.

In Step 804, the user interface encrypts the sensitive configuration data item using the key obtained in Step 802. In one embodiment of the invention, only the sensitive configuration data item itself, but not the entire communication between user interface and management service is encrypted, thus enabling a firewall to inspect the communication that includes the encrypted sensitive configuration data item.

In Step 806, the user interface sends the encrypted sensitive configuration data item to the management service. In Step 808, the management service stores the encrypted sensitive configuration data item, received from the user interface, in the configuration database. In one embodiment of the invention, the encrypted configuration data item remains encrypted, while stored in the configuration database.

In one or more embodiments of the invention, the method described in FIG. 8 may also be performed for configuration data items that do not need to be protected from unauthorized access. In this case, the method described in FIG. 8 may be performed without encrypting the configuration data item.

FIG. 9 shows a method for configuring a computing device using the set of objects, the cache list object, and the cache list pointer in accordance with one or more embodiments of the invention. While the methods described in FIGS. 7 and 8 may have been performed in advance without effecting a configuration change on the computing device, the execution of the method described in FIG. 9 is authoritative and therefore changes the configuration according to the configuration conveyed by the cache list object and the objects sent to the computing device. In one embodiment of the invention, the method described in FIG. 9 may be used to perform an initial configuration of the computing device and/or to update the configuration of the computing device as needed. The method described in FIG. 9 may be executed, for example, in order to deploy a new application, to add or remove users, to update entitlements, etc.

Turning to FIG. 9, in Step 900, the computing device sends the current local cache list pointer to the management service. As previously described, the cache list pointer is a unique identifier for all objects used in a configuration. Accordingly, the current cache list pointer provides a snapshot of the current configuration of the entire computing device at the time the computing device was configured using the objects represented by the cache list pointer, which may be used, for example, to document the progression of the computing device processing a configuration. The management service may, for example, archive the current cache list pointer in order to document the configuration of the computing device.

In Step 902, the management service sends the cache list object and the cache list pointer, previously generated in Step 708, to the computing device. In Step 904, the computing device inspects the fingerprints in the cache list object received from the management service and identifies missing objects. Objects from a previous configuration may still be valid if the new configuration requires the same objects. These objects may be reused with the new configuration. Missing objects may be objects that are newly required, i.e., objects that were not part of the previous configuration, or where at least one of the fields in the object, (i.e., object name, object type, parent fingerprint, object revision ID, or object content) has changed. In one embodiment of the invention, the computing device may detect any change in an object by comparing the object fingerprint from the cache list object with the object fingerprint of the previous configuration of the computing device. Any change to the object may result in a different fingerprint and may therefore be detected by comparing the fingerprints. Accordingly, an object is detected as missing, if the fingerprint of the object is missing, or if the fingerprint of the current object is different from the fingerprint in the cache list object.

Continuing with the discussion of FIG. 9, in Step 906, the computing device downloads the missing objects and subsequently stores the objects. In one embodiment of the invention, the computing device may obtain the missing objects from the management service by requesting the objects from the management service. In one embodiment of the invention, some objects received from the management service may include the object content. These objects, after having been received from the management service, may be stored on the computing device.

In one embodiment of the invention, some objects, requested from the management service may reference information (described above) instead of including the object content itself, as previously discussed with reference to FIG. 7. In such case, the computing device may therefore contact the management service or the file server/the peer computing device in order to obtain the object content. If the location where the object content may be retrieved from is the management server, the computing device may request the object content from the management server, and in response the computing device may receive the object content. In one embodiment of the invention, if the location where the object content may be retrieved from is a file server/a peer computing device, the computing device may contact the file server/the peer computing device and may present the authentication code, provided as part of the object, to the file server/the peer computing device, in order to prove that the computing device is authorized to receive the object content. In one embodiment of the invention, the object content on the file server/the peer computing device is encrypted. The object content may have been encrypted by the management service when the object content was originally delivered to the file server/the peer computing device. The encryption may have been performed by the management service, for example, using a public key provided by the file server/the computing device or any other type of cryptographic protection. Accordingly the file server/the peer computing device may decrypt the object content, for example, using the corresponding private decryption key, and subsequently may generate a re-encrypted copy of the object content using an key provided by the computing device. In one embodiment of the invention, the provided key is the public key of a public-private key pair generated by the TPM of the computing device. Alternatively the key may be any other type of key provided by the computing device. Subsequently, the file server/the peer computing device sends the re-encrypted object content to the computing device. After the re-encrypted copy of the object content has been transferred to the computing device, the re-encrypted copy of the object content may be deleted from the file server/the peer computing device. The computing device may decrypt the received re-encrypted object content using the corresponding private key. In one embodiment of the invention, the computing device then verifies the integrity of the received object content by generating a fingerprint of the received object content (which may be, for example an SHA-1 or and SHA-2 hash) and by comparing the fingerprint with the fingerprint included in the corresponding reference information received from the management service. The computing device may only accept the object content received from the file server/the peer computing device if the fingerprints match. If the computing device has successfully verified the integrity of the object content, the object content may be stored on the computing device.

In one embodiment of the invention, reference information may include multiple locations from where the object content may be retrieved. In this case, the computing device may contact the first location and retrieve the object content from the first location, as previously described. If the first location does not respond, or cannot provide the object content, the computing device may contact the subsequent locations in numeric order, e.g., the second location, the third location, etc, until a source that can provide the object content to the computing device is located.

In Step 908, the computing device deletes objects that are not part of the latest cache list object. The objects to be deleted may include, for example, objects that were required by a previous cache list object and that are now obsolete In Step 910, the computing device applies the configuration defined by the objects that are now present (after steps 900-908) on the computing device. Accordingly, the computing device may begin to operate in accordance with the configuration provided by the objects sent to the computing device by the management service in Step 902. The following section lists non-limiting examples of actions that may be performed in step 910: (i) if the configuration includes instructions for deploying an application, the application may be deployed, (ii) if the configuration includes parameter updates, the parameters to be updated may be updated; (iii) if the configuration includes instructions for sharing object content (e.g., a software image) with peer computing devices (i.e., other computing devices), the computing device may begin making the object content available to peer computing devices requesting the object content; and (iv) if the computing device receives a request for the object content from a peer computing device, the computing device may verify the authentication code presented by the peer computing device against an expected authentication code that may have been provided to the computing device with the object instructing the computing device to share the object content and, if the presented authentication code matches the expected authentication code, then the computing device may proceed and provide the peer computing device with the object content, as previously described.

In Step 912, the computing device returns the cache list pointer to the management service. In one embodiment of the invention, the cache list pointer is generated based on the objects that define the new configuration of the computing device documents the entire current configuration of the computing device. Accordingly, the returned cache list pointer may be used by the management service to confirm that the computing device has been configured or is being updated as specified by the cache list object sent to the computing device in Step 902. In one embodiment of the invention, the management service may archive the returned cache list pointer. The archived cache list pointers, collected over time, may later be used to reconstruct the entire configuration history of the computing device. Further, in one embodiment of the invention, a service or application running on the computing device may use the fingerprint of the object directly responsible for the service or application to report a status, statics, or any type of event. Accordingly, the management service may be able to link the status, statistics or event to the object responsible for the application or service providing the report, thereby providing additional monitoring and debugging capabilities.

Embodiments of the invention may enable a management service to configure a managed computing device in an efficient and secure manner. The configuration of a computing device may be achieved with a minimum of communication between the management service and the computing device by exchanging cache list pointers that uniquely encode all aspects of a configuration. Further, configuration objects, used to convey elements of the configuration, may be efficiently communicated from the management service to the computing device using object fingerprints grouped in a cache list object. The computing device may identify missing objects by inspecting the fingerprints and may only request the missing objects, thereby avoiding the transfer of all objects of the configuration from the management service to the computing device. In addition, missing objects may be retrieved from various locations optimized for reachability, thereby minimizing network congestion and accelerating the availability of the missing object. Further, elements of the configuration that require protection from unauthorized access are safely communicated in a manner that enables firewalls to inspect the communication.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring computing devices, comprising:
   receiving, by a computing device, a first cache list object from a management service;
   comparing the first cache list object to a second cache list object on the computing device;
   based on the comparing, identifying a first object fingerprint that is present in the first cache list object and that is not present in the second cache list object;
   obtaining, from a location that is external to the computing device, a first object corresponding to the first object fingerprint;
   updating a configuration of the computing device using the first object;
   based on the comparing, identifying a second object fingerprint that is present on the second cache list object and that is not present in the first cache list object; and
   removing, from the computing device, a second object corresponding to the second object fingerprint,
   wherein updating the configuration of the computing device is performed after removing the second object, and
   wherein updating the configuration does not use any object content from the second object.

2. The method of claim 1, wherein the first object comprises object content, wherein the updating the configuration comprises using the object content.

3. The method of claim 2, wherein the object content is a software image.

4. The method of claim 2, wherein the object content is a credential.

5. The method of claim 1, wherein the first object comprises reference information, wherein the reference information comprises a second location of object content for the first object, an authentication code associated with the second location and a fingerprint associated with the object content.

6. The method of claim 5, further comprising:
   sending a request for the object content to the second location, wherein the request comprises the authentication code;
   receiving encrypted object content from the second location;
   decrypting the encrypted object content to obtain the object content; and
   verifying the object content using the fingerprint associated with the object content,
   wherein updating the configuration comprises using the object content.

7. The method of claim 6, further comprising:
   generating, by a trusted platform module on the computing device, a public-private key pair; and
   providing the public key to the second location;
   wherein the encrypted object content is encrypted using the public key,
   wherein the encrypted object content is decrypted using the private key.

8. The method of claim 5, wherein the second location is a second computing device, wherein the computing device is managed by the management service.

9. The method of claim 1, wherein the location is the management service.

10. The method of claim 1, further comprising:
    generating, by the computing device and after the updating, a third cache list object using at least the first object;
    generating, by the computing device, a cache list pointer using the third cache list object; and
    providing the cache list pointer to the management service.

11. A non-transitory computer readable medium comprising computer readable program code, which when executed by a computer processor enables the computer processor to:
    receive, by a computing device, a first cache list object from a management service;
    compare the first cache list object to a second cache list object on the computing device;
    based on the comparing, identify a first object fingerprint that is present on the first cache list object and that is not present in the second cache list object;
    obtain, from a location that is external to the computing device, a first object corresponding to the first object fingerprint;
    update a configuration of the computing device using the first object;
    based on the comparing, identify a second object fingerprint that is present on the second cache list object and that is not present in the first cache list object; and
    remove, from the computing device, a second object corresponding to the second object fingerprint,
    wherein updating the configuration of the computing device is performed after removing the second object, and
    wherein updating the configuration does no use any object content from the second object.

12. The non-transitory computer readable medium of claim 11, wherein the first object comprises object content, wherein the updating the configuration comprises using the object content.

13. The non-transitory computer readable medium of claim 12, wherein the object content comprises at least one selected from a group consisting of a software image and a credential.

14. The non-transitory computer readable medium of claim 11, further comprising computer readable program code, which when executed by the computer processor enables the computer processor to:
 send a request for the object content to a second location, wherein the first object comprises reference information, wherein the reference information specifies the second location for object content for the first object and comprises an authentication code associated with the second location and a fingerprint associated with the object content, wherein the request comprises the authentication code;
 receive encrypted object content from the second location;
 decrypt the encrypted object content to obtain the object content; and
 verify the object content using the fingerprint associated with the object content,
 wherein updating the configuration comprises using the object content.

15. The non-transitory computer readable medium of claim 11, further comprising computer readable program code, which when executed by the computer processor enables the computer processor to:
 generate, by the computing device and after the updating, a third cache list object using at least the first object;
 generate, by the computing device, a cache list pointer using the third cache list object; and
 provide the cache list pointer to the management service.

16. A computing device, comprising:
 a server comprising a processor and a non-transitory computer readable medium comprising computer readable program code, which when executed by the processor enables the server to:
  provide at least one integrity measurement for the server to a management service;
  receive, after providing the at least one integrity measurement, a first cache list object from a management service;
  compare the first cache list object to a second cache list object on the computing device;
  based on the comparing, identify a first object fingerprint that is present on the first cache list object and that is not present in the second cache list object;
  obtain, from a location that is external to the computing device, a first object corresponding to the first object fingerprint;
  update a configuration of the computing device using the first object;
  based on the comparing, identify a second object fingerprint that is present in the second cache list object and that is not present in the first cache list object; and
  remove, from the computing device, a second object corresponding to the second object fingerprint,
  wherein updating the configuration of the computing device is performed after removing the second object, and
  wherein updating the configuration does not use any object content from the second object.

17. The computing device of claim 16,
 wherein the server further comprises a trusted platform module configured to generate a public-private key pair;
 wherein the non-transitory computer readable medium further comprises computer readable program code, which when executed by the processor enables the server to:
  send a request for the object content to a second location, wherein the first object comprises reference information, wherein the reference information specifies the second location for object content for the first object and comprises an authentication code associated with the second location and a fingerprint associated with the object content, wherein the request comprises the authentication code;
  provide the public key to the second location;
  receive encrypted object content from the second location;
  decrypt, using the private key, the encrypted object content to obtain the object content; and
  verify the object content using the fingerprint associated with the object content,
  wherein updating the configuration comprises using the object content.

18. The computing device of claim 16, further comprising:
 a network adaptor operatively connected to the server,
 wherein the network adaptor is configured to provide at least one integrity measurement for the network adaptor to the management service prior to the computing device receiving the first cache list object.

* * * * *